(12) United States Patent
Xiao et al.

(10) Patent No.: US 11,145,987 B2
(45) Date of Patent: Oct. 12, 2021

(54) ULTRALIGHT ARTIFICIAL MEDIUM MULTILAYER CYLINDRICAL LENS

(71) Applicant: XIAN XIAO S'ANTENNA TECHNOLOGY CO., LTD., Shaanxi (CN)

(72) Inventors: Liang Yong Xiao, Shaanxi (CN); Yu Wen Ren, Shaanxi (CN); Jian Qing Wang, Shaanxi (CN); Ya Wang, Shaanxi (CN)

(73) Assignee: XIAN XIAO S'ANTENNA TECHNOLOGY CO., LTD., Shaanxi (CN)

( * ) Notice: Subject to any disclaimer, the term of this patent is extended or adjusted under 35 U.S.C. 154(b) by 92 days.

(21) Appl. No.: 16/491,157

(22) PCT Filed: Aug. 16, 2018

(86) PCT No.: PCT/CN2018/100882
§ 371 (c)(1),
(2) Date: Sep. 4, 2019

(87) PCT Pub. No.: WO2019/034119
PCT Pub. Date: Feb. 21, 2019

(65) Prior Publication Data
US 2019/0393614 A1 Dec. 26, 2019

(30) Foreign Application Priority Data

Aug. 18, 2017 (CN) .......................... 201710713195.8
Nov. 14, 2017 (CN) .......................... 201711122204.2

(51) Int. Cl.
*H01Q 15/08* (2006.01)
(52) U.S. Cl.
CPC .................................. *H01Q 15/08* (2013.01)

(58) Field of Classification Search
CPC ........ H01Q 15/02; H01Q 15/08; H01Q 15/10; H01Q 19/06; H01Q 19/062; C08L 23/06; C08L 25/06; C08L 27/06; C08L 2203/14
See application file for complete search history.

(56) References Cited

U.S. PATENT DOCUMENTS 6,081,239 A * 6/2000 Sabet ...................... H01Q 1/40
343/700 MS
6,219,006 B1 * 4/2001 Rudish ..................... H01Q 1/36
343/700 MS
(Continued)

FOREIGN PATENT DOCUMENTS

CN 101057370 10/2007
CN 205122778 3/2016
(Continued)

OTHER PUBLICATIONS

"International Search Report (Form PCT/ISA/210) of PCT/CN2018/100882," dated Nov. 7, 2018, with English translation thereof, pp. 1-4.

*Primary Examiner* — Thai Pham
(74) *Attorney, Agent, or Firm* — JCIP Global Inc.

(57) ABSTRACT

Provided in the present invention is an ultralight artificial medium multilayer cylindrical lens, comprising n concentric layers of different dielectric constants. The center cylindrical layer is expressed as layer 1 and is a solid cylinder. Layers 2 to n are in a sequentially outward nested arrangement surrounding the center cylindrical layer and respectively are n-1 concentric rings. The n concentric layers are assembled into a multilayer cylinder and are characterized in that the dielectric constants of the n concentric layers gradually decrease from layer 1 to layer n and vary specifically between 2.05 to 1.05. The n concentric layers are made of a base material of low dielectric constant added with a material of high dielectric constant and low specific gravity. The (Continued)

lens so manufactured has a total apparent density of 0.08-0.095 g/cm³.

7 Claims, 2 Drawing Sheets

(56) References Cited

U.S. PATENT DOCUMENTS

| | | | | |
|---|---|---|---|---|
| 2008/0191952 | A1* | 8/2008 | Tokoro | C04B 38/06 |
| | | | | 343/753 |
| 2011/0003131 | A1* | 1/2011 | Matitsine | C08J 9/0085 |
| | | | | 428/296.4 |
| 2015/0070230 | A1* | 3/2015 | Bradley | H01Q 19/062 |
| | | | | 343/753 |
| 2018/0269586 | A1* | 9/2018 | Kawahata | H01Q 15/08 |
| 2019/0058251 | A1* | 2/2019 | Kawahata | H01Q 5/35 |

FOREIGN PATENT DOCUMENTS

| | | |
|---|---|---|
| CN | 105470659 | 4/2016 |
| CN | 105659434 | 6/2016 |
| CN | 106099382 | 11/2016 |
| CN | 107946774 | 4/2018 |
| CN | 107959121 | 4/2018 |
| CN | 107959122 | 4/2018 |
| CN | 107968266 | 4/2018 |
| DE | 4430832 | 11/1995 |

* cited by examiner

ULTRALIGHT ARTIFICIAL MEDIUM MULTILAYER CYLINDRICAL LENS

CROSS-REFERENCE TO RELATED APPLICATION

This application is a 371 of international application of PCT application serial no. PCT/CN2018/100882, filed on Aug. 16, 2018, which claims the priority benefits of China application no. 201710713195.8, filed on Aug. 18, 2017 and China application no. 201711122204.2, filed on Nov. 14, 2017. The entirety of each of the above-mentioned patent applications is hereby incorporated by reference herein and made a part of this specification.

BACKGROUND

Technical Field

The present invention relates to the field of antenna engineering technology, and more particularly, to an ultralight artificial medium multilayer cylindrical lens.

Description of Related Art

With the rapid expansion of demand in the wireless field of mobile communication 4G, 5G, MIMO, satellite communications, radar, electronic warfare, etc., new technical requirements have also been proposed for antennas as wireless gateways. In order to meet the requirements of high gain, low side lobes, narrow beam, wide beam coverage, etc., it is also necessary to increase the network speed and consider the cost and environment. The most important of these is that the antenna must be able to carry large information capacity without increasing its quantity, weight and site.

The multi-beam antenna developed in recent years is a solution. Conventional multi-beam antennas are constructed by using a multi-beam forming network (BFN) to excite a planar array of radiating elements, or a multi-stage Butler matrix or the like. However, it is difficult to apply on a large scale due to the problems of asymmetric beam, isolation, loss of gain due to network loss, narrow band, etc. The traditional Luneburg lens technology has the potential to carry multiple antennas and multiple beams. However, due to the heavy weight of the Luneburg lens and the extremely complicated manufacturing process, it has long been used as a radar passive target detection, airport runway blind drop and other bands above 8 GHz. A small number of applications are difficult to enter the civilian sector.

The traditional Luneburg ball antenna is mainly made by punching and foaming, and the process is time consuming and the product weighs too much. The punching method is very difficult to operate in hole positioning and processing, and because of the large number of holes, there are problems such as deformation and mechanical strength during the manufacturing process, and the robustness between the parts is low, and this design can only be realized. The macroscopic dielectric constant is equivalent. In fact, the efficiency of the lens antenna is very low. There is also a certain defect in the production of the Luneburg lens by the foaming method. The dielectric constant of the material obtained by the conventional foaming method is hard to exceed 1.4. If it is to be improved, the density of the material will inevitably be large and the weight will be increased. Moreover, since the density of the foamed material is difficult to precisely control, and the foamed beads are liable to undergo secondary foaming or shrinkage, resulting in a gap between the materials, the dielectric constant is difficult to precisely control.

In order to solve the above problems and reduce the weight of the Luneburg ball, the researchers have worked for decades. Recently, a multi-beam Luneburg ball lens antenna for mobile communication has been seen on the market (Matsine Ball, US20110003131A1 used in the millions of mass rally in the US President Trump's inauguration in 2017). According to the inventor, Matsine Luneburg ball is 8 times lighter than natural media material (polytetrafluoroethylene) and 3-4 times lighter than the artificial medium Luneburg ball on the market. It is the lightest artificial medium Luneburg ball ever, and the antenna gain is 21 dBi. Like the traditional mobile communication base station antenna, the Matsine Luneburg ball antenna is also equipped with a complex vertical beam downtilt mechanism due to the narrow beamwidth of the vertical plane, which increases the operational difficulty, complexity and cost of the application.

Chinese invention patent (201511027751.3: a lightweight medium filled multi-beam cylindrical Luneburg lens antenna) discloses a three-layer cylindrical Luneburg dielectric lens antenna. The invention achieve the desired graded dielectric constant by filling the opening of the low dielectric constant disc-shaped base material with a high dielectric constant dielectric material, and the density of the holes above the three-layer lens is densely packed from the outside to the inside. It is difficult to control the dielectric constant of each lens layer by this method, and it is also difficult to obtain the specific dielectric constant value of each layer, and the dielectric constant can only be changed macroscopically. Moreover, the process of opening holes in the base material is cumbersome, the drilling process is difficult, and the number of holes is large, and the deformation and mechanical strength of the material need to be considered. The lens antenna is flat, and there is no advantage in vertical plane radiation.

Chinese invention patent (201610393370.5: manufacturing method of Luneburg lens antenna) discloses a manufacturing method of a Luneburg lens antenna, comprising the following steps: pre-expansion treatment of a foaming raw material; according to the design of each lens layer of the Luneburg lens antenna, the foaming raw material after pre-expansion is arranged to obtain a foaming raw material particle combination, and a corresponding mold is produced; the foaming raw material particle combination is added to a corresponding mold to be molded, and each lens layers of the Luneburg lens antenna is obtained; each lens layer is assembled. The invention can improve the accuracy of the dielectric constant of each lens layer of the Luneburg lens, and the performance of the Luneburg lens antenna can be improved. However, the production process is cumbersome, and the use of the mold is complicated, and the temperature and reaction time are controlled very accurately, and it is difficult to mass-produce.

In addition, the Aerospace Special Materials and Process Technology Institute applied for a series of patents related to the Luneburg lens antenna, including spherical and hemispherical Luneburg lenses, which are similar in structure and manufacturing methods. Taking the Chinese utility model patent (201520112560.6: a hemispherical lens antenna) as an example, it discloses a hemispherical Luneburg lens antenna consisting of n hemispherical layers with different dielectric constants, which are manufactured using additive materials (usually it is produced by means of 3D printing). The produced lens includes cavities of various shapes and sizes, and finally the gradation of the dielectric constant is achieved. The lens prepared by this method does not require a mold, and the dielectric constant of each layer can be accurately controlled. However, the use of the additive manufacturing method to manufacture the lens has certain limitations in material selection, and it is impossible to use a foam material having a very low density. For example, PLA or ABS used in the embodiment of the present invention has a large density of materials, and even if a lens is included in the prepared lens, the total apparent density of the lens is difficult to reach a very low level, and the lens weight is made. It is still difficult to have a big breakthrough. When used in the civil field, the quality is still not dominant.

Chinese invention patent (200580038415.7: Luneberg dielectric lens and method of manufacturing the same) discloses a hemispherical dielectric lens comprising a plurality of concentric hemispherical layers, and each layer being a thermoplastic resin expanded bead containing 0 to 80% by weight of ceramic Foam moldings. Although the hemispherical dielectric lens disclosed in the invention can overcome the disadvantages of the conventional antenna to achieve greater gain and lighter weight, the lens manufacturing process needs to mix the ceramic with the foam expansion beads and then use the mold for foaming. The requirements are high and it takes a long time to prepare the mold. In addition, the total apparent density of the hemispherical lens provided in the embodiment is between 0.17 and 0.27 g/cm$^3$. Although this density is already lower than that of most lenses in the prior art, there is still the possibility of continued optimization.

SUMMARY

The technical problem to be solved by the present invention is to provide a simple processing, ultralight quality, and ultra-wide frequency artificial medium multilayer cylindrical lens, to solve the defects of the existing spherical or hemispherical Luneberg lens: difficult to process, excessive quality, and narrow beam width of the vertical plane.

The technical scheme adopted by the present invention is: An ultralight artificial medium multilayer cylindrical lens, comprising n concentric layers of different dielectric constants, the center cylindrical layer is a solid cylinder, and it is expressed as layer 1, layers 2 to layers n are in a sequentially outward nested arrangement surrounding the center cylindrical layer and respectively are n-1 concentric rings, the n concentric layers are assembled into a multilayer cylinder, wherein, the dielectric constants of the n concentric layers gradually decrease from layer 1 to layer n and vary specifically between 2.05 to 1.05, each of the n concentric layers comprises a base material of low dielectric constant and a additive material of high dielectric constant and low specific gravity, the base material is a light foaming dielectric material, specifically has a density of 0.02-0.03 g/cm$^3$; wherein, the content of the additive material in the n concentric layers per unit volume gradually decreases from the layer 1 to the layer n.

Preferably, the light foaming dielectric material is polystyrene, polyvinyl chloride or polyethylene.

Preferably, the additive material is one or more of ceramic powder, aluminum silver powder, and metal wire.

Preferably, the dielectric constant of each concentric layer is determined by the electromagnetic response and density of the additive material contained in each layer.

Wherein, the dielectric constant values of the n concentric layers in the cylindrical lens were determined by a dielectric constant detector.

Wherein, after the preparation of the 2 to the n concentric layers, n-1 concentric rings are formed and are nested with the first layer to form the cylindrical lens, and each layer are tightly seamless when nested.

Wherein, the structural parameters and performance parameters of the cylindrical lens are determined by the actual working needs of the antenna.

Preferably, the structural parameter comprises the diameter, height, and the number of layers of the cylindrical lens, and the performance parameter comprises the dielectric constant value of each concentric layer.

Preferably, the multilayer cylindrical lens has a diameter of 20-90 cm and a height of 20-70 cm.

Wherein, the multilayer cylindrical lens has a total apparent density of 0.08-0.095 g/cm$^3$.

In addition, the cylindrical lens proposed by the present invention can also be used in an antenna system to construct an ultra-wideband and multi-beam antenna, and the ultra-wideband refers to a frequency of 0.6 GHz to 28 GHz.

The ultralight artificial medium multilayer cylindrical lens provided by the invention comprises the following steps:

(1) Selecting a light foaming dielectric material as a base material;

(2) Determining various parameters of the ultralight artificial medium multilayer cylindrical lens;

(3) Adding different ratios of high dielectric constant and low specific gravity additive materials to the base material; initially obtaining a sample of each layer of the cylindrical lens; and testing the dielectric constant value of the sample of each layer of the cylindrical lens;

(4) Adjusting the amount of additive materials in each layer according to the dielectric constant value of the sample of each layer of the cylindrical lens, and finally obtaining a sample of each layer of the cylindrical lens conforming to the design requirements of the dielectric constant;

(5) Uniformly magnifying the sample of each layer in step (4), making the sample of the 2-n layer into the n-1 concentric rings, and assembling the n-1 concentric rings and the layer 1 into the n-layer concentric cylinder as a preliminary cylindrical lens;

(6) Testing the preliminary cylindrical lens in a microwave darkroom, measuring the antenna gain and direction of the antenna, and adjusting the dielectric constant value of each concentric layer according to the antenna parameters;

(7) Finally determining the amount of additive material that should be added to each concentric layer according to the dielectric constant value determined in step (6);

(8) Preparing a sample of each layer of the cylindrical lens, and magnifying and nesting into a desired cylindrical lens referring to step (5);

(9) Measuring the cylindrical lens combined with the antenna unit to get the gain and direction of the antenna until it meets the design requirements.

Comparing to the prior art, the beneficial effects produced by the present invention are:

(1) The ultralight artificial medium lens provided by the present invention changes the dielectric constant of different layers of the lens by adding a high dielectric constant material to the low dielectric constant base material, and the fabrication techniques is simple, convenient, and quick. The dielectric constant of each layer of material can be accurately measured, which overcomes the problem of mechanical deformation and inaccurate dielectric constant caused by punching in the conventional process, and there will be no gap between layers caused by secondary foaming or material shrinkage in foaming process.

(2) Compared with the conventional spherical or hemispherical Luneberg lens, the artificial medium multilayer cylindrical lens provided by the invention is simpler, cylindrical instead of spherical or hemispherical is used, which used in the antenna has the characteristics of multi-beam and vertical plane pattern width.

(3) The artificial medium multilayer cylindrical lens provided by the invention can be made according to the specific needs of the antenna index, and most importantly, the lens produced is ultra-light, ultra-low density, and it's total apparent density is only 0.08-0.095 g/cm$^3$, which is lower than all artificial medium lenses in the prior art, and the lens has a characteristic of ultra-wideband (even applicable to frequencies above 28 GHz). This will greatly expand the application of the lens in the fifth generation (5G) civil and military fields, and combine with antenna technology to form an artificial medium lens antenna, particularly applicable in crowded areas and large data traffic areas.

(4) The lens provided by the present invention can be applied to the field of antennas, and provides a practical carrier for constructing a multi-beam antenna. When used, the antenna unit is usually fixed on the outside of the artificial medium multilayer cylindrical lens. When compared with the conventional electronically modulated antenna, the vertical surface lobes are wider and cover, and the field strength is fully dominant in most areas. Therefore, the traditional vertical lobe electric adjustment down-tilt mechanism can be omitted, and it can fix two-dimensional scanning (horizontal and vertical surface coverage simultaneously exist) in traditional base station antenna (including the Luneberg multi-beam antenna) with wide sectorization and save a lot of energy consumption and cost, save site resources, especially suitable for crowded areas and big data traffic business areas.

(5) The artificial medium multilayer cylindrical lens provided by the present invention has a simple fabrication techniques, and due to the cylindrical lens is small in volume, ultra-light in weight, and ultra-wide in frequency band, the antenna using the cylindrical lens can be applied to the military and civilian fields, overcoming the conventional antenna being too bulky or the equipment complicated is difficult to enter the shortcomings of the civilian sector.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only it is a certain embodiment of the present invention, and those skilled in the art can obtain other drawings according to the structures shown in the drawings without any creative work.

DESCRIPTION OF THE EMBODIMENTS

Figure 1:
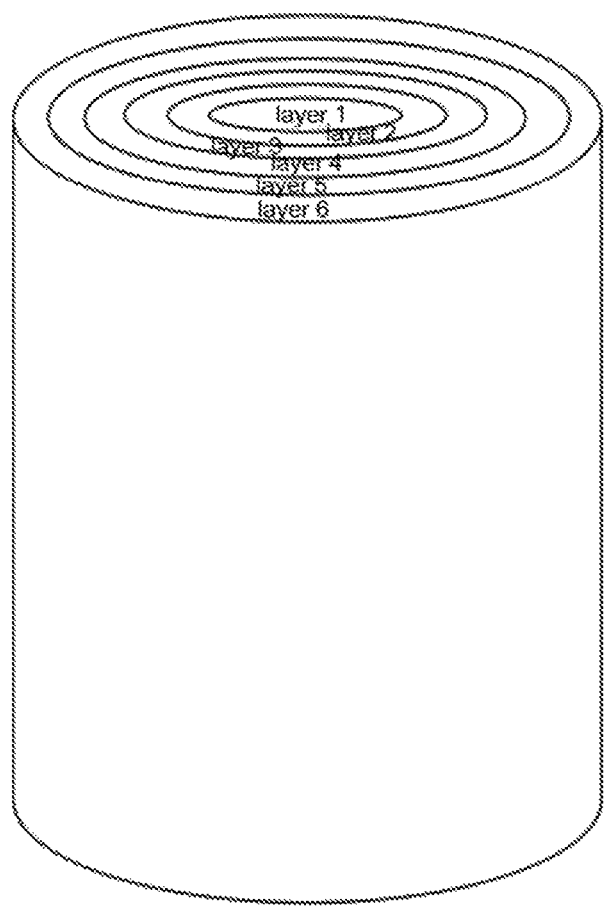
FIG. 1 is a stereogram of a 6-layer cylindrical lens of an artificial medium provided by the present invention.

The invention provides an ultra-light artificial medium multilayer cylindrical lens comprising n concentric layers having different dielectric constants, the central cylindrical layer being represented as a first layer and being a solid cylinder; layers 2 to n are in a sequentially outward nested arrangement surrounding the center cylindrical layer and respectively are n-1 concentric rings, the n concentric layers are assembled into a multilayer cylinder, wherein, the dielectric constants of the n concentric layers gradually decrease from layer 1 to layer n and vary specifically between 2.05 to 1.05; each of the n concentric layers comprises a base material of low dielectric constant and a additive material of high dielectric constant and low specific gravity, by adding the high dielectric constant material to the substrate, the dielectric constant of the substrate can be increased.

Among them, the substrate is a light foaming medium material, which can be made of the following materials: polyethylene, polystyrene, polytetrafluoroethylene, polypropylene, polyurethane and polyvinyl chloride, wherein the preferred density is 0.02-0.03 g/cm$^3$, more preferably, the material is polystyrene, polyvinyl chloride or polyethylene.

Among them, the amount of the additive material contained in the n concentric layers per unit volume is gradually decreased from the first layer to the nth layer, and the additive material is a material having a high dielectric constant, when combined with low dielectric constant substrates, n concentric layers can realize dielectric constant gradient. When selecting materials, the density and electromagnetic response should be considered. In order to broaden the application range of the lens and reduce the lens quality, materials with lower density and higher dielectric constant should be selected. Considering the above factors, the additive material in the present invention is preferably one or more of ceramic powder, aluminum silver powder, and metal wire, the additive material may have a cylindrical shape, a powder shape, a block shape, a needle shape, a spherical shape, etc., preferably needle-like or spherical.

When preparing the cylindrical lens of the present invention, firstly, according to the designed dielectric constant value, an additive material selected according to density and electromagnetic response is added to the selected substrate, and a sample of each layer of the substrate is initially prepared. The amount of the additive material per unit volume in each layer is reduced from the first layer to the n-th layer layer by layer. Since the substrate used in the invention is a light foam material with low dielectric constant, the dielectric constant values of concentric layers of cylindrical lenses will be increased with the increase of material volume per unit volume after adding high dielectric constant materials into the substrate. It should be noted that the outermost layer, that is, the amount of the additive material contained in the nth layer, should be extremely small or 0, to ensure that the outermost dielectric constant is closer to air.

Subsequently, the dielectric constant value of each of the preliminary samples was tested using a dielectric constant detector, and the amount of the added material having a high dielectric constant added to each layer was adjusted according to the measured value of the dielectric constant equivalent of +/−0.05, and make a sample and retest until a final sample of each concentric layer of substrate meets the initial design requirements for dielectric constant.

The various concentric layer substrate samples were uniformly enlarged to obtain respective concentric layers. The 2-n layer is then formed into concentric rings and assembled with the first layer enlarged into a solid cylindrical shape to form a preliminary n-layer concentric cylindrical lens. It should be noted that the efficiency of the lens is affected by the gap between the layers, the more and the gap, the lower the lens efficiency. This is because when the gap is large, radio waves are unnecessarily reflected or refracted through the air-layer interface, which causes a decrease in antenna gain or an increase in side lobes. Therefore, when assembling n concentric layers into a cylindrical lens, it should be ensured that no gap is left and tightly bonded to get a multi-layered cylinder.

Combining the primary cylindrical lens and antenna technology prepared above into an artificial medium lens antenna, testing the microwave darkroom of the antenna, testing the gain and direction of the antenna, adjusting the dielectric constant value of each concentric layer according to the antenna parameters; testing the antenna Gain, directional pattern (see other inventors' invention patent application: 201711016223.7: multi-beam antenna based on artificial medium cylindrical lens sector; 201711016267.X: high-beam coverage multi-beam antenna based on artificial medium cylindrical lens; 201711009402.8: based on artificial medium cylindrical lens omnidirectional multi-beam antenna), adjust the dielectric constant value of each concentric layer according to the antenna parameters, and finally determine the amount of added material to be added in each concentric layer.

Each concentric layer substrate sample was re-prepared according to the determined addition amount, and enlarged, and nested to form a desired cylindrical lens. Then, the combined cylindrical lens and the antenna unit are combined to form an antenna for measurement, and the gain and direction pattern of the antenna are tested to ensure that various index parameters meet the design requirements.

It should be noted that the difference in the electromagnetic response of the added material should affect the dielectric constant value, therefore, the amount of material added in each layer will affect the dielectric constant value of the sample of each layer, essentially also the electromagnetic response of the additive material affects the dielectric constant values of the various layers of the lens. The effect of the electromagnetic response of the added material on the performance of the lens is demonstrated by the dielectric constant value tested by the dielectric constant tester and the resulting antenna measurement, therefore, in the production process, it is necessary to comprehensively consider the various indicators of the lens to select the added materials and the amount of addition.

The number, height and diameter of the cylindrical lens used in the present invention, as well as the number of antenna elements, and the arrangement outside the cylindrical lens can be selected or produced according to the application scenario and the antenna index, and can be adapted to various application requirements.

For satisfying antenna performance and installation space requirements, the cylindrical lens height provided by the present invention is preferably 20-70 cm, more preferably 25-60 cm, most preferably 30-50 cm, and the diameter of the cylindrical lens is preferably 20-90 cm, more preferably 30-60 cm, most preferably 35-50 cm.

The "ultralight" in the ultralight artificial medium multilayer cylindrical lens provided by the present invention is that after the final preparation of the lens, the total apparent density of the entire lens is 0.08-0.095 $g/cm^3$, and the contrast polystyrene density is 1.05 $g/cm^3$ can calculate that the ultra-light artificial medium multilayer cylindrical lens provided by the present invention is about 11 times lighter than polystyrene. Compared with the lens of the Chinese invention patent (200580038415.7: Luneberg dielectric lens and its manufacturing method) disclosed in the total lens apparent density of 0.17-0.27 $g/cm^3$, the lens density provided by the present invention is 2-3 times lower than the conventional, so the antenna is also superior in comparison. This ultralight feature makes its application range much larger than in the past.

The ultra-light artificial medium multilayer cylindrical lens provided by the invention has the characteristics of ultra-wide frequency, in particular, the application frequency can be almost the same performance (dielectric constant, low insertion loss) from the frequency of 0.6 GHz to 28 GHz and above in mobile communication. It has an extremely broad prospect in the field of electromagnetic radiation and scattering.

The specific embodiments of the present invention will be described in detail below with reference to the accompanying drawings.

Example 1

Figure 2:
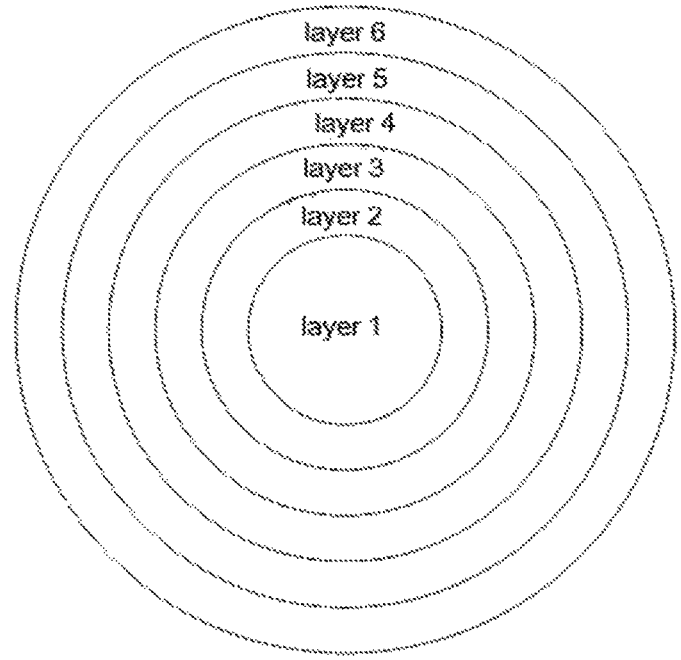
FIG. 2 is a cross-sectional view of a 6-layer cylindrical lens of an artificial medium provided by the present invention.

Referring to FIG. 1 and FIG. 2, in one embodiment of the present invention, a six-layer artificial medium cylindrical lens having a height of 30 cm and a diameter of 36 cm is provided. Table 1 shows specific parameters of each layer of the lens. The resulting lens has a total apparent density of only 0.092 $g/cm^3$, ultra-low density and ultra-light weight.

TABLE 1

| | layer | | | | | |
| --- | --- | --- | --- | --- | --- | --- |
| | layer 1 | layer 2 | layer 3 | layer 4 | layer 5 | layer 6 |
| Design dielectric constant value | 1.85 | 1.6 | 1.45 | 1.3 | 1.15 | 1.08 |
| Final dielectric constant value | 1.85 +/− 0.05 | 1.6 +/− 0.05 | 1.45 +/− 0.06 | 1.3 +/− 0.07 | 1.15 +/− 0.03 | 1.08 +/− 0.03 |
| Inside diameter (mm) | — | 95.5 | 156.4 | 208.6 | 256.9 | 311.4 |
| Outer diameter (mm) | 95.4 | 156.3 | 208.4 | 256.8 | 311.2 | 360.2 |

When the cylindrical lens is applied to a multi-beam antenna, due to the special action of its columnar structure on the elevation plane, a complicated electro-optic down-tilt mechanism can be omitted compared to a conventional spherical or hemispherical lens. Such as a 6-layer cylindrical lens provided by the present invention, the antenna gain of the unit antenna excitation can reach 18.39 dBi when operating at 2500 MHz.

Example 2

Figure 3:
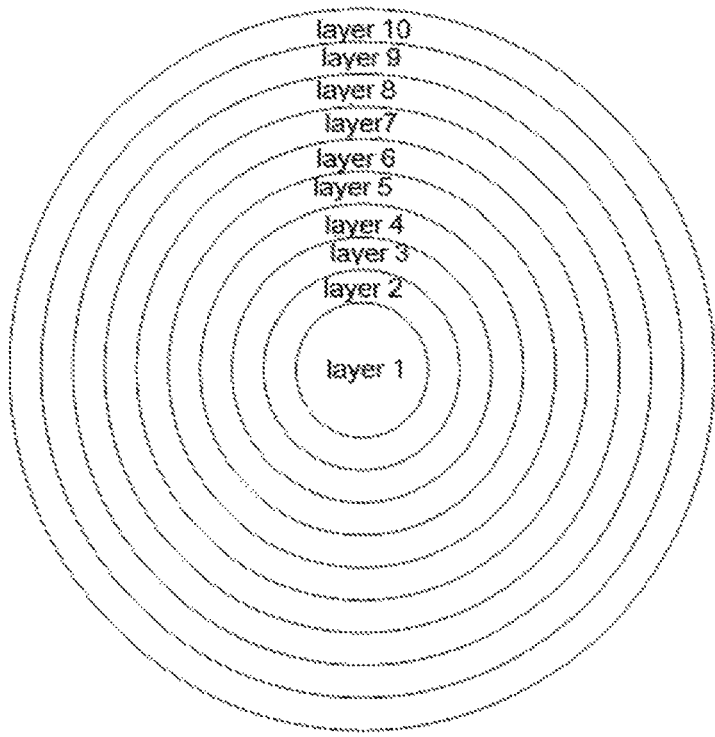
FIG. 3 is a cross-sectional view of a 10-layer cylindrical lens of an artificial medium provided by the present invention.

Referring to FIG. 3, in another embodiment of the present invention, a 10-layer artificial medium cylindrical lens having a height of 50 cm and a diameter of 65 cm is provided, table 2 shows specific parameters of each layer of the lens, and is finally made, the total apparent density of the lens is only 0.086 $g/cm^3$, the density is ultra-low, the quality is ultra-light, and the application range is wider.

TABLE 2

| | layer 1 | layer 2 | layer 3 | layer 4 | layer 5 | layer 6 | layer 7 | layer 8 | layer 9 | layer 10 |
|---|---|---|---|---|---|---|---|---|---|---|
| Design dielectric constant value | 1.95 | 1.85 | 1.7 | 1.58 | 1.48 | 1.38 | 1.28 | 1.18 | 1.1 | 1.05 |
| Final dielectric constant value | 1.95 +/− 0.03 | 1.85 +/− 0.03 | 1.7 +/− 0.04 | 1.58 +/− 0.03 | 1.48 +/− 0.03 | 1.38 +/− 0.04 | 1.28 +/− 0.03 | 1.18 +/− 0.04 | 1.1 +/− 0.03 | 1.05 +/− 0.02 |
| Inside diameter (mm) | — | 175.7 | 236.4 | 293.2 | 345.9 | 396.9 | 447.2 | 496.7 | 548.4 | 600.4 |
| Outer diameter (mm) | 175.6 | 236.3 | 293.2 | 345.8 | 396.9 | 447.1 | 496.7 | 548.4 | 600.3 | 650.1 |

In addition, when the cylindrical lens is used to construct a multi-beam antenna in the antenna system, combined with the antenna element, a 10-beam full-frequency 180-degree sector horizontal coverage antenna with a de-electrification tilting mechanism can be constructed, which can eliminate the complex vertical beam tilting mechanism installed in the traditional antenna. When the antenna works at 850 MHz/1920 MHz, the gain of the low-frequency antenna can reach 14.6 dBi, the gain of high frequency antenna can reach 20 dBi.

The artificial medium multilayer cylindrical lens provided by the invention has the layer number, the height, the diameter and the dielectric constant of each layer are designed according to the actual needs of the antenna index, and the preparation method is simple, and the obtained dielectric constant value of the lens is more in line with the ideal design. The most important thing is that the lens produced is ultra-light, ultra-low density and ultra-wide application frequency, which will greatly expand the application of the lens in the military and civilian fields, especially in crowded areas and big data traffic areas.

When the lens provided by the present invention is combined as a carrier and an antenna unit, a wider vertical coverage can be achieved, and it is no longer necessary to install a complicated vertical beam down-tilt mechanism, which is not available in the conventional Luneburg ball antenna. It is also one of the biggest highlights of the present invention.

The detailed descriptions of the foregoing are merely illustrative of the possible embodiments of the present invention, and are not intended to limit the scope of the present invention, which is within the knowledge of those skilled in the art. Various changes made without departing from the spirit of the invention are within the scope of the invention.

What is claimed is:

1. An ultralight artificial medium multilayer cylindrical lens, comprising concentric layers of different dielectric constants, wherein the concentric layers comprise a center cylindrical layer which is a solid cylinder, and annular layers which are in a sequentially outward nested arrangement surrounding the center cylindrical layer; the concentric layers are assembled into a multilayer cylinder;
   the dielectric constants of the concentric layers gradually decrease from the center cylindrical layer to an outermost annular layer of the annular layers and vary specifically between 2.05 to 1.05;
   each of the concentric layers comprises a base material of low dielectric constant and an additive material of high dielectric constant and low specific gravity;
   the base material is a light foaming dielectric material, specifically has a density of 0.02-0.03 g/cm$^3$;
   a content of the additive material in the concentric layers per unit volume gradually decreases from the center cylindrical layer to the outermost annular layer.

2. The cylindrical lens according to claim 1, wherein the light foaming dielectric material is polystyrene, polyvinyl chloride or polyethylene.

3. The cylindrical lens according to claim 1, wherein the additive material is one or more of ceramic powder, aluminum silver powder, and metal wire.

4. The cylindrical lens according to claim 1, wherein after the preparation of the annular layers, the annular layers are formed and are nested with the center cylindrical layer to form the cylindrical lens, and any two adjacent concentric layers are tightly gapless when nested.

5. The cylindrical lens according to claim 1, wherein structural parameters and performance parameters of the cylindrical lens are determined by actual working needs of an antenna.

6. The cylindrical lens according to claim 5, wherein the structural parameters comprise a diameter, a height and the number of layers of the cylindrical lens, and the performance parameters comprise a dielectric constant value of each concentric layer.

7. The cylindrical lens according to claim 1, wherein the cylindrical lens has a total apparent density of 0.08-0.095 g/cm$^3$.

* * * * *